(12) United States Patent
Lee et al.

(10) Patent No.: US 8,781,164 B2
(45) Date of Patent: Jul. 15, 2014

(54) CONTROL OF MOBILE ROBOT BY DETECTING LINE INTERSECTIONS

(75) Inventors: Seongsu Lee, Seoul (KR); Sangik Na, Seoul (KR); Yiebin Kim, Seoul (KR); Seungmin Baek, Seoul (KR)

(73) Assignee: LG Electronics Inc., Seoul (KR)

( * ) Notice: Subject to any disclaimer, the term of this patent is extended or adjusted under 35 U.S.C. 154(b) by 308 days.

(21) Appl. No.: 13/219,290

(22) Filed: Aug. 26, 2011

(65) Prior Publication Data

US 2012/0051595 A1    Mar. 1, 2012

(30) Foreign Application Priority Data

Aug. 31, 2010  (KR) ................. 10-2010-0085107

(51) Int. Cl.
*G06K 9/00* (2006.01)
(52) U.S. Cl.
USPC ........... 382/103; 382/153; 382/154; 700/259; 701/28; 701/523
(58) Field of Classification Search
None
See application file for complete search history.

(56) References Cited

U.S. PATENT DOCUMENTS

| | | | |
|---|---|---|---|
| 2009/0024251 A1 | 1/2009 | Myeong et al. | |
| 2009/0038089 A1* | 2/2009 | Landry et al. | 15/3 |
| 2009/0154791 A1 | 6/2009 | Yoon et al. | |
| 2009/0281661 A1* | 11/2009 | Dooley et al. | 700/258 |
| 2010/0070078 A1 | 3/2010 | Kong et al. | |

OTHER PUBLICATIONS

Jeong et al. (Oct. 2006) "Visual SLAM with line and corner features." Proc. 2006 IEEE/RSJ Int'l Conf. on Intelligent Robots and Systems, pp. 2570-2575.*
Jeong et al. (Aug. 2005) "CV-SLAM: A new ceiling vision-based SLAM technique." Proc. 2005 IEEE/RSJ Intl Conf. on Intelligent Robots and Systems, pp. 3195-3200.*
Choi et al. (Jun. 2010) "CV-SLAM using ceiling boundary." Proc. 2010 IEEE Conf. on Industrial Electronics and Applications, pp. 228-233.*
Facchinetti et al. (1995) "Self-positioning robot navigation using ceiling image sequences." Proc. Asian Conf. on Computer Vision, vol. 3 pp. 814-818.*
Xu et al. (May 2009) "Ceiling-based visual positioning for an indoor mobile robot with monocular vision." IEEE Trans. on Industrial Electronics, vol. 56 No. 5, pp. 1617-1628.*
Davison, A. (2003) "Real-time simultaneous localisation and mapping with a single camera." Proc. 9$^{th}$ IEEE Int'l Conf. on Computer Vision, vol. 2 pp. 1403-1410.*

* cited by examiner

*Primary Examiner* — Barry Drennan
(74) *Attorney, Agent, or Firm* — McKenna Long & Aldridge LLP

(57) ABSTRACT

Disclosed are a mobile robot and a controlling method of the same. The mobile robot is capable of reducing a position recognition error and performing a precise position recognition even in the occurrence of a change of external illumination, through geometric constraints, when recognizing its position with using a low quality camera (e.g., camera having a low resolution). Furthermore, feature points may be extracted from images detected with using a low quality camera, and the feature points may be robustly matched with each other even in the occurrence of a change of external illumination, through geometric constraints due to the feature lines. This may enhance the performance of the conventional method for recognizing a position based on a camera susceptible to a illumination change, and improve the efficiency of a system.

18 Claims, 5 Drawing Sheets

(a) TYPE 1     (b) TYPE 2     (c) TYPE 3

CONTROL OF MOBILE ROBOT BY DETECTING LINE INTERSECTIONS

CROSS-REFERENCE TO RELATED APPLICATION

This application claims the benefit of Korean Patent Application No. 10-2010-0085107, filed on Aug. 31, 2010, which is hereby incorporated by reference for all purposes as if fully set forth herein.

BACKGROUND OF THE INVENTION

1. Field of the Invention

This specification relates to a mobile robot capable of precisely recognizing its position with using an upper camera, and a controlling method of the same.

2. Background of the Invention

Generally, a robot has been developed for an industrial use, and has managed some parts of factory automation. As the robot is applied to various fields recently, medical robots, space robots, home robots, etc. are being developed.

A representative of the home robot is a robot cleaner, a kind of home electronic appliance capable of performing a cleaning operation by sucking peripheral dust or foreign materials with autonomously moving on a predetermined region. This robot cleaner is provided with a chargeable battery, and is provided with an obstacle sensor for avoiding an obstacle while moving.

Even in the occurrence of a change of external illumination, the mobile robot may have a degraded performance when matching image feature points in a method for recognizing its position, due to a brightness difference between the conventional image and the currently-captured image. In this case, a position compensation using a camera is impossible to cause a large error in recognizing an absolute position of the mobile robot. Substantially, not only mobile robots which operate for a long time such as an industrial robot, a security robot and a service robot, but also home robots such as a robot cleaner may not perform a precise position recognition with using a low quality camera, due to a change of external illumination.

SUMMARY OF THE INVENTION

Therefore, an aspect of the detailed description is to provide a mobile robot capable of reducing a position recognition error and performing a precise position recognition even in the occurrence of a change of external illumination, through geometric constraints, when recognizing its position with using a low quality camera, and a controlling method of the same.

Another aspect of the detailed description is to provide a mobile robot capable of robustly matching feature points even in the occurrence of a change of external illumination, through geometric constraints due to three-dimensional (3D) lines, when extracting feature points from images detected with using a low quality camera, and capable of matching the feature points with each other, and a controlling method of the same.

To achieve these and other advantages and in accordance with the purpose of this specification, as embodied and broadly described herein, there is provided a mobile robot, comprising: an image detection unit configured to detect one or more images by capturing the periphery; a straight line extraction unit configured to extract one or more straight lines from the image; a feature line extraction unit configured to extract, from the straight lines, one or more feature lines toward the center of the image; a feature point extraction unit configured to extract one or more feature points from the image; and a control unit configured to match the feature points with each other, and to recognize a position of the mobile robot based on a result of the feature point matching.

The mobile robot may further comprise a storage unit configured to store therein image information including an image detected by the image detection unit, a feature line extracted by the feature line extraction unit, and a feature point extracted by the feature point extraction unit. Here, the control unit may be configured to match a feature point stored in the storage unit with a feature point of an image detected by the image detection unit, and to recognize a position of the mobile robot based on a result of the feature point matching.

To achieve these and other advantages and in accordance with the purpose of this specification, as embodied and broadly described herein, there is also provided a method for controlling a mobile robot, the method comprising: an image detection step of detecting one or more images by capturing the periphery; a straight line extraction step of extracting one or more straight lines from the image; a feature line extraction step of extracting, from the straight lines, one or more feature lines toward the center of the image; a feature point extraction step of extracting one or more feature points from the image; a feature point matching step of matching the feature points with each other; and a position recognition step of recognizing a position of the mobile robot based on a result of the feature point matching.

The method may further comprise an image information storage step of storing therein image information including the image, the feature line and the feature point. In the position recognition step, the stored feature point may be matched with the feature point of the detected image, and a position of the mobile robot may be recognized based on a result of the feature point matching.

In the mobile robot and the controlling method of the same according to the present invention, a position recognition error may be reduced and a position recognition of the mobile robot may be precisely performed even in the occurrence of a change of external illumination when recognizing its position with using a low quality camera (e.g., camera having a low resolution).

In the mobile robot and the controlling method of the same according to the present invention, feature points may be extracted from images detected with using a low quality camera, and the feature points may be robustly matched with each other even in the occurrence of a change of external illumination, through geometric constraints due to the feature lines.

In the mobile robot and the controlling method of the same according to the present invention, the performance of the conventional method for recognizing a position based on a camera susceptible to a illumination change may be enhanced, and the efficiency of a system may be improved.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1:
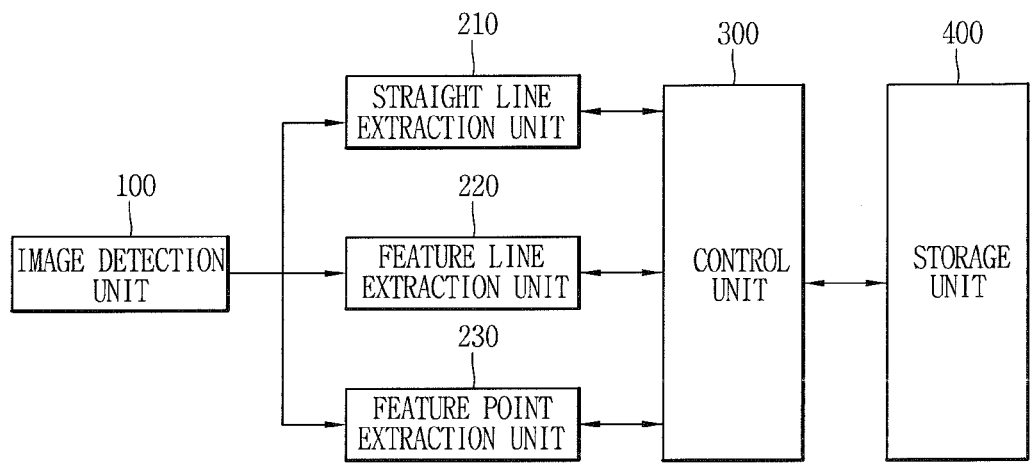
FIGS. 1 and 2 are block diagrams schematically illustrating a configuration of a mobile robot according to preferred embodiments of the present invention.
Figure 2:
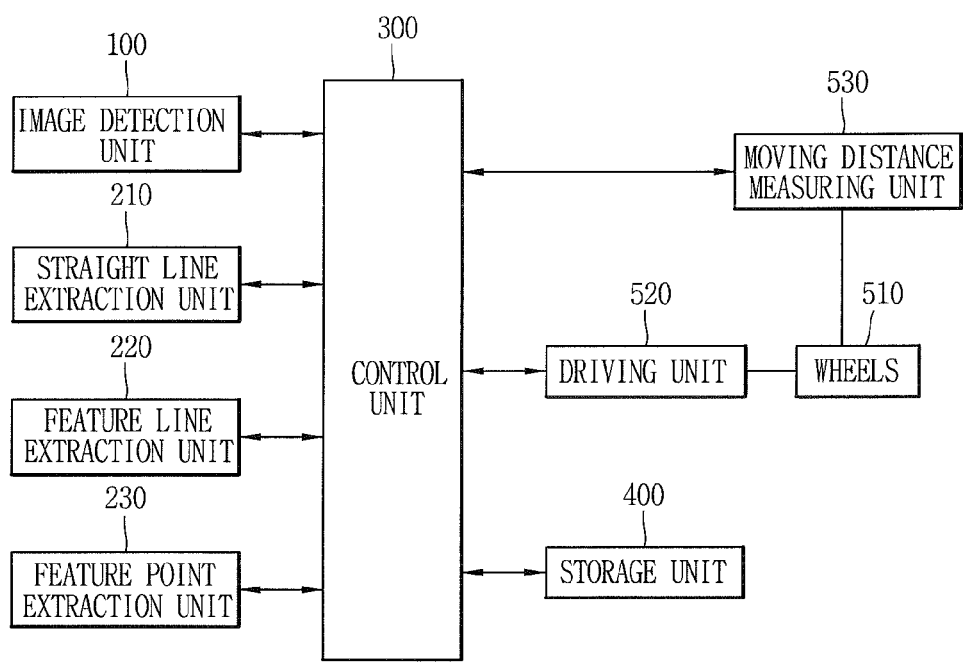
Figure 4:
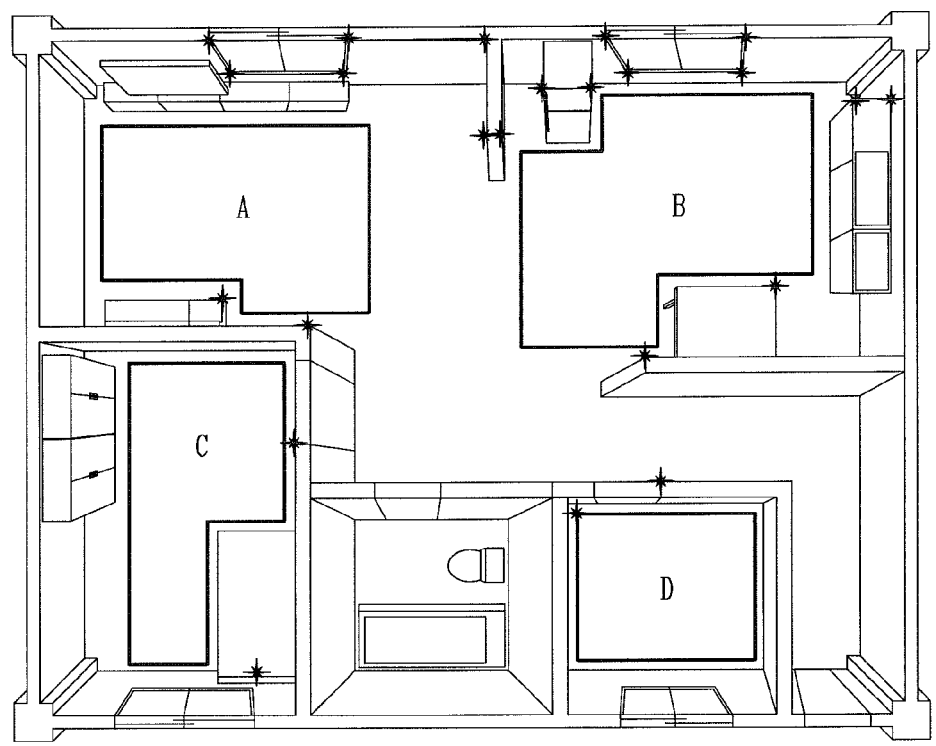
FIG. 4 is a view for explaining an operation to extract feature points by a mobile robot according to an embodiment of the invention.
Figure 6:
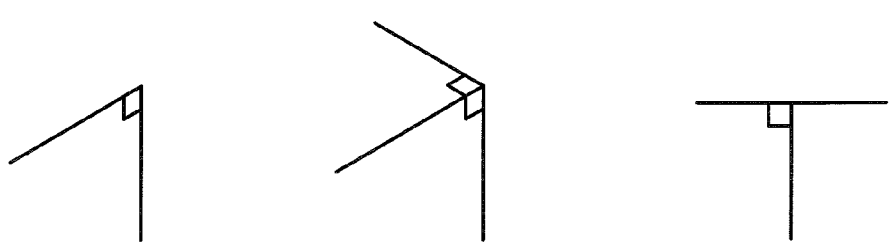
FIG. 6 is a view illustrating geometric types formed by feature lines and straight lines according to preferred embodiments of the present invention.
Figure 7:
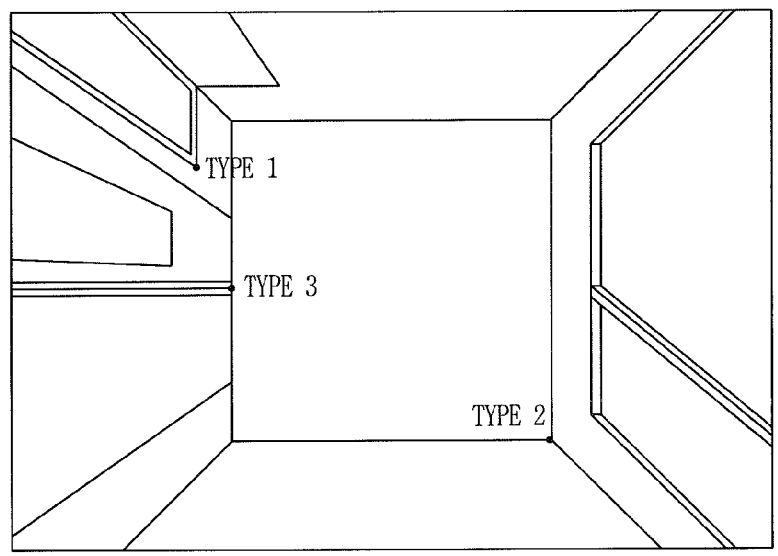
FIG. 7 is a view for explaining an operation to extract the shapes of FIG. 6 from an image detected by the mobile robot according to an embodiment of the invention.

Referring to FIG. 1, a mobile robot according to one embodiment of the present invention comprises an image detection unit 100, a straight line detection unit 210, a feature line extraction unit 220, a feature point extraction unit 230 and a control unit 300. The image detection unit 100 is configured to detect one or more images by capturing the periphery. The straight line extraction unit 210 is configured to extract one or more straight lines from the image detected by the image detection unit 100. The feature line extraction unit 220 is configured to extract, from the straight lines extracted by the straight line extraction unit 210, one or more feature lines toward the center of the image detected by the image detection unit 100. The feature point extraction unit 230 is configured to extract one or more feature points from the image detected by the image detection unit 100. Here, the feature points may include ceiling edges, corners, a lamp, etc in the image detected by the image detection unit 100, as shown by FIG. 4. For example, the feature points may have a high frequency variation in the frequency domain. Also, the feature points may exist in an intersection between a straight line and a feature line, or between one feature line and another feature line, as shown by FIGS. 6 and 7. And, the control unit 300 is configured to match the feature points extracted by the feature point extraction unit 230 with each other, and to recognize a position of the mobile robot based on a result of the feature point matching. Here, the control unit 300 is configured to match feature points extracted from a plurality of images detected by the image detection unit 100 with each other, and to recognize a position of the mobile robot based on a result of the feature point matching.

Referring to FIG. 1, the mobile robot according to one embodiment of the present invention further comprises a storage unit 400 configured to store therein image information including an image detected by the image detection unit 100, a feature line extracted by the feature line extraction unit 210 and a feature point extracted by the feature point extraction unit 220. Here, the control unit 300 is configured to match a feature point stored in the storage unit 400 with a feature point of an image detected by the image detection unit 100, and to recognize a position of the mobile robot based on a result of the feature point matching.

The image detection unit 100 is implemented as an upper camera installed above the mobile robot, and configured to detect an upper image by capturing an upper side. Alternatively, the image detection unit 100 may be implemented as a front camera configured to detect a front image by capturing a front side. The image detection unit 100 may include a lens. As the lens, preferably used is a lens having a wide viewing angle so that all regions of an upper side or a front side, e.g., all regions of a ceiling can be captured. For instance, the lens may have a viewing angle more than 160°.

The straight line extraction unit 210 is configured to extract one or more straight lines from the images including a ceiling positioned at an upper side, a fluorescent lamp positioned at a front side and an interior structure. Alternatively, the images may include a wall, a ceiling, etc.

The feature line extraction unit 220 extracts, from the straight lines extracted by the straight line extraction unit 210, feature lines emitted from the center of the image, i.e. the position of camera. The feature lines are extracted in the form of vertical lines such as walls, window frames and door frames. FIG. 6 is a view illustrating geometric types formed by feature lines and straight lines, and FIG. 7 illustrates implementations of the feature lines of FIG. 6. Referring to FIG. 7, type 1 is implemented at a corner of an extraneous (sticked) matter such as a mirror, type 2 is implemented at a corner of a room, and type 3 is implemented at an overlapped part between door frames or window frames. The types are implemented by intersecting feature lines and other straight lines with each other, and intersection points are implemented as the feature points. Here, the feature lines indicate vertical lines toward the center of a camera view along an extraneous (sticked) matter on a wall, such as a door, a window and a mirror.

The feature point extraction unit 230 is configured to extract one or more feature points having coordinate information with respect to each of the plurality of images. Referring to FIG. 4, the feature points indicate natural indicators such as a ceiling of an upper region, a fluorescent lamp of a front region and an interior structure, which are from the image detected by the image detection unit 100. Here, the feature point includes feature point information consisting of a position, an orientation and a descriptor of the feature point on the image, and the descriptor indicates extraction information of the feature point. The descriptor indicates a characteristic of the feature point, which corresponds to a matrix of a predetermined size and including the feature point on the image. The descriptor includes a type or a shape of a structure corresponding to a position extracted from the image.

Some of feature points extracted by the feature point extraction unit 230 are positioned on the feature line. More concretely, intersection points between the feature lines and the straight lines are extracted as the feature points.

The control unit 300 calculates a similarity between the feature points based on the feature point information, and recognizes a position of the mobile robot based on feature points having a largest similarity therebetween. The control unit 300 matches feature points with each other by using feature point information on the feature points extracted, by the feature point extraction unit 230, from the plurality of images detected by the image detection unit 100. Then, the control unit 300 recognizes a position of the mobile robot based on a result of the feature point matching. Also, the control unit 300 matches feature points with each other by using image information pre-stored in the storage unit 400, i.e., information on images, feature lines, feature points, etc. detected by the image detection unit 100, and recognizes a position of the mobile robot based on a result of the feature point matching. The feature points have a distance therebetween, by which a similarity between the feature points is determined. More concretely, the feature points have a large similarity when a distance therebetween is short. On the other hand, the feature points have a small similarity when a distance therebetween is long. For instance, the feature points may be expressed as $(x_{1,i}, y_{1,i})$ and $(x_{1,j}, y_{1,j})$. Alternatively, the feature points may be expressed as points on a three-dimensional coordinates system. Here, the distance $(\Delta)$ between feature points may be represented as the following Equation 1.

$$\Delta = \sqrt{(x_{1,i}-x_{2,i})^2+(y_{1,i}-y_{2,i})^2}$$ [Equation 1]

For instance, when the distance between feature points obtained by the Equation 1 is less than a predetermined value, the control unit 300 determines that the feature points are the same feature point, and matches the feature points with each other.

The storage unit 400 may be configured to further store therein information on an obstacle detected while the mobile robot moves. The storage unit 400 stores therein straight lines, feature lines and feature points extracted by the straight line extraction unit 210, the feature line extraction unit 220 and the feature point extraction unit 230. And, the storage unit 400 may further include a program for driving the mobile robot.

Figure 5:
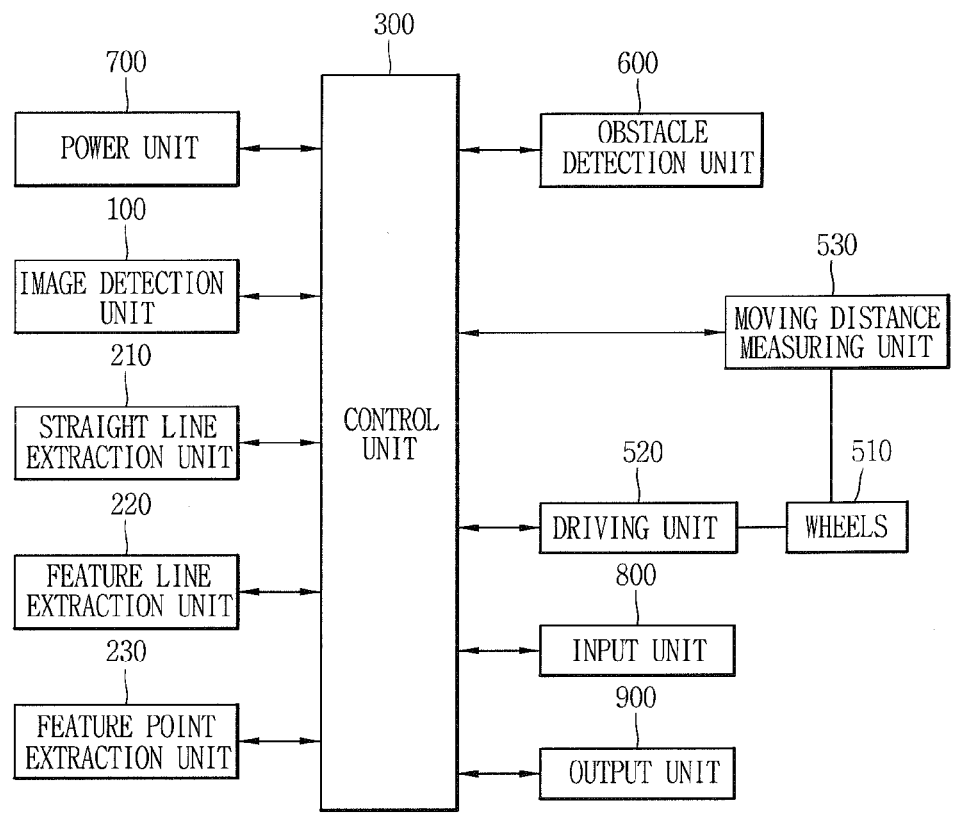
FIG. 5 is a block diagram schematically illustrating a configuration of the mobile robot of FIG. 3.

Referring to FIG. 5, the mobile robot according to one embodiment of the present invention further comprises wheels 510, a driving unit 520 configured to move the mobile robot by driving the wheels 510, and a moving distance measuring unit 530 connected to the wheels 510 and configured to measure a moving distance. Here, a position of the mobile robot may be more precisely recognized by combining a moving distance measured by the moving distance measuring unit 530, with a recognized position of the mobile robot based on the result of the feature point matching.

Figure 3:
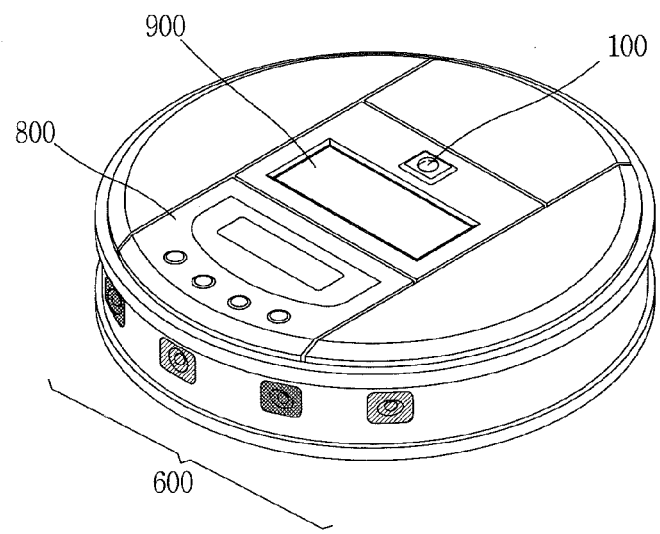
FIG. 3 is a perspective view illustrating the appearance of a mobile robot according to one embodiment of the present invention.

FIG. 3 is a perspective view illustrating the appearance of a mobile robot according to one embodiment of the present invention, and FIG. 5 is a block diagram schematically illustrating a configuration of the mobile robot of FIG. 3.

Referring to FIGS. 3 and 5, a mobile robot according to one embodiment of the present invention comprises an image detection unit 100, a straight line detection unit 210, a feature line extraction unit 220, a feature point extraction unit 230, a control unit 300 and a storage unit 400. The image detection unit 100 is configured to detect one or more images by capturing the periphery. The straight line extraction unit 210 is configured to extract one or more straight lines from the image detected by the image detection unit 100. The feature line extraction unit 220 is configured to extract, from the straight lines extracted by the straight line extraction unit 210, one or more feature lines toward the center of the image detected by the image detection unit 100. The feature point extraction unit 230 is configured to extract one or more feature points from the image detected by the image detection unit 100. The control unit 300 is configured to match the feature points extracted by the feature point extraction unit 230 with each other, and to recognize a position of the mobile robot based on a result of the feature point matching. The storage unit 400 is configured to store therein image information including an image detected by the image detection unit 100, a feature line extracted by the feature line extraction unit 210 and a feature point extracted by the feature point extraction unit 220. Explanations about the image detection unit 100, the straight line extraction unit 210, the feature line extraction unit 220 and the feature point extraction unit 230 will be omitted.

The mobile robot according to one embodiment of the present invention further comprises wheels 510, a driving unit 520 configured to move the mobile robot by driving the wheels 510, and a moving distance measuring unit 530 connected to the wheels 510 and configured to measure a moving distance. The driving unit 520 is configured to move the mobile robot by driving a wheel motor for rotating the plurality of wheels 510. The wheels 510 include a plurality of main wheels and one or more auxiliary wheels. While the mobile robot according to one embodiment of the present invention is moved by the driving unit 520, a plurality of images are detected by the image detection unit 100. As the moving distance measuring unit 530, mainly used is an encoder connected to a wheel motor for driving the wheels of the mobile robot, and configured to detect a speed. The moving distance measuring unit 530 may be implemented as an acceleration sensor configured to recognize a speed and a position of the mobile robot, a gyro sensor configured to detect a rotation speed of the mobile robot, etc. The control unit 300 verifies a matching result between feature points based on a moving distance measured by the moving distance measuring unit 530, and recognizes a position of the mobile robot based on a verified result.

Referring to FIG. 5, the mobile robot according to one embodiment of the present invention further comprises an obstacle detection unit 600 configured to detect a peripheral obstacle. The control unit 300 is configured to create a map based on obstacle information acquired through the obstacle detection unit 600, and to establish (set) a cleaning path or a running path based on the map. The control unit 300 is configured to correct the cleaning path or the running path based on a recognized position of the mobile robot, and to perform a cleaning operation based on the corrected cleaning path or to run based on the corrected running path. The obstacle detection unit 600 is configured to detect an obstacle in the vicinity of the mobile robot while the mobile robot is moving or is performing a cleaning operation at an indoor room such as a house or an office, and to transmit obstacle information including the existence of an obstacle, a position, a size, etc. to the control unit 300. As the obstacle detection unit 600, may be used an infrared ray sensor, a supersonic wave sensor, a radio frequency (RF) sensor, a bumper, etc. Alternatively, the obstacle detection unit 600 may be implemented as a position sensitive device (PSD) sensor capable of precisely calculating a distance with using a supersonic wave sensor or an infrared ray triangulation. The obstacle detection unit 600 may measure a distance between the mobile robot and a wall surface with using a laser range finder (LRF) for measuring a precise distance by detecting a laser which is reflected after being emitted. Based on the measured distance between the mobile robot and a wall surface, the obstacle detection unit 600 may detect a type, a position, etc. of the wall surface. Obstacle information acquired through the obstacle detection unit 600 may be stored in the storage unit 400.

The control unit 300 may be configured to create a map based on the obstacle information acquired through the obstacle detection unit 600, and to establish (set) a cleaning path or a running path based on the map. A method for creating a map has been well-known or may be easily modified by general techniques, and thus detailed explanations thereof will be omitted.

The storage unit 400 may further store therein information on an obstacle detected while the mobile robot runs or performs a cleaning operation. And, the storage unit 400 may store therein a plurality of images detected by the image detection unit 100, one or more straight lines extracted by the straight line extraction unit 210, one or more feature lines extracted by the feature line extraction unit 220, and one or more feature points extracted by the feature point extraction unit 230. The storage unit 400 is preferably implemented as a non-volatile memory. The non-volatile memory (NVM, NVRAM) indicates a storage device capable of maintaining stored information even when no power is supplied. The non-volatile memory includes ROM, a flash memory, a magnetic computer memory device (e.g., hard disk, diskette drive and magnetic tape), an optical disk drive, magnetic RAM (MRAM), phase-change RAM (PRAM), etc. And, the storage unit 400 may further store therein moving information, cleaning information, etc. of the mobile robot within a cleaning region, and may further include a program for driving the mobile robot.

The control unit 300 may be configured to correct the cleaning path or the running path based on a position recognized through a matching result between feature points, and based on a position verified with using a matching point or a moving distance, and to perform a cleaning operation based on the corrected cleaning path or to run based on the corrected running path.

The mobile robot may further include a power unit 700 having a chargeable power supply means and configured to supply power into the mobile robot. The power unit 700 supplies power necessary for the mobile robot to move and to perform a cleaning operation. If a current amount remaining in the power supply means (i.e., battery) of the power unit 700 is deficient, the power unit 700 receives a charging current from a charging plate.

The mobile robot may further include an input unit 800 configured to directly input a control command, or to input a command for instructing output of obstacle information or information stored in the storage unit 400. The input unit 800 may be further provided with at least one input button such as an OK button, a set button, a re-set button, a deletion button, a cleaning start button and a stop button. According to a command inputted through the input button, the mobile robot performs certification, set, reset, deletion, etc. with respect to information on a position of an obstacle, a position of the mobile robot, etc., information on feature lines and feature points, a map, a cleaning path, a running path, etc.

The mobile robot may further include an output unit 900 configured to display images stored in the storage unit 400, feature line information, feature point information, obstacle information, or a map created by the control unit 300. The output unit 900 may be configured to further display state information including a current state of each component of the mobile robot, a current cleaning state, etc. The output unit 900 may be implemented as one of a Light Emitting Diode (LED), a Liquid Crystal Display (LCD), a Plasma Display Panel (PDP) and an Organic Light Emitting Diode (OLED).

A user may input a control command through the input unit 800, thereby selecting a sector or a room requiring a cleaning operation from a map displayed on the output unit 900. And, the user may input a control command for establishing (setting) a cleaning pattern, a cleaning order, etc. The input unit 800 and the output unit 900 may be implemented in the form of a touch screen on which both an input and an output can be implemented.

The mobile robot according to one embodiment of the present invention extracts a plurality of feature points from an image, and recognizes its position by matching the feature points with each other. Here, the mobile robot may reduce the amount of calculations and may match feature points with each other more precisely, by extracting a plurality of feature lines from an image and by matching the feature points formed by the feature lines and straight lines with each other. Part of the feature points may disappear or may be newly extracted according to an illumination change. When illumination is drastically changed, e.g., when illumination is turned on/off, part of the feature points may be generated or may disappear. However, in the mobile robot according to the present invention, feature points robust against an illumination change are extracted through geometric constraints, and the feature points are matched with each other. This may allow a position of the mobile robot to be more precisely recognized without environmental constraints.

Figure 8:
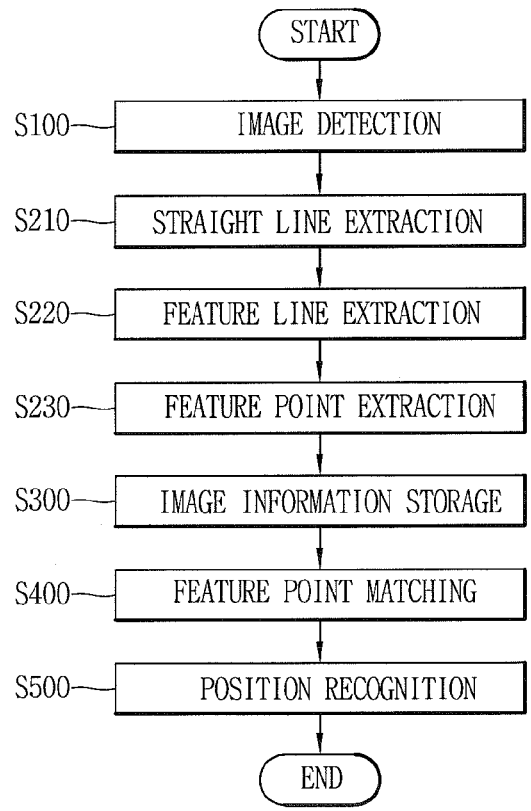
FIG. 8 is a flowchart schematically illustrating a method for controlling a mobile robot according to one embodiment of the present invention.

Referring to FIG. 8, a method for controlling a mobile robot according to one embodiment of the present invention comprises an image detection step (S100) of detecting one or more images by capturing the periphery, a straight line extraction step (S210) of extracting one or more straight lines from the image, a feature line extraction step (S220) of extracting, from the straight lines, one or more feature lines toward the center of the image, a feature point extraction step (S230) of extracting one or more feature points from the image, a feature point matching step (S400) of matching the feature points with each other, and a position recognition step (S500) of recognizing a position of the mobile robot based on a result of the feature point matching. Device configurations will be explained with reference to FIGS. 1 to 7.

The method for controlling a mobile robot according to one embodiment of the present invention further comprises an image information storage step (S300) of storing therein image information including the image, the feature line and the feature point. In the position recognition step (S500), the stored feature point is matched with the feature point of the detected image (S400), and a position of the mobile robot is recognized based on a result of the feature point matching.

The position recognition step (S500) includes calculating each similarity between the feature points based on the feature point information, comparing the similarities with each other (not shown), and recognizing a position of the mobile robot based on feature points having a largest similarity therebetween.

Firstly, the mobile robot detects a plurality of images through the image detection unit (S100). Here, the image detection unit may be implemented as an upper camera for detecting an upper image by capturing an upper side, or a front camera for detecting a front image by capturing a front side. Then, the mobile robot extracts feature points from the plurality of images including a ceiling positioned at an upper side, a fluorescent lamp positioned at a front side and an interior structure (S230). The mobile robot calculates a distance between feature points to calculate a similarity. Then, the mobile robot matches the feature points with each other based on the similarity (S400). Here, the distance indicates not a substantial distance, but a distance in a feature point space. The feature points have a large similarity when a distance therebetween is short. On the other hand, the feature points have a small similarity when a distance therebetween is long. The feature point includes feature point information consisting of a position, an orientation and a descriptor of the feature point on the image, and the descriptor indicates extraction information of the feature point.

The mobile robot extracts one or more straight lines from the image (S210). The straight line is extracted from a plurality of images such as an upper region including a ceiling, a fluorescent lamp disposed at a front side and an interior structure. The mobile robot extracts, from the straight lines, a straight line emitted from the center of a camera view, i.e., a feature line (S220). The feature line is extracted in the form of a vertical line such as a wall, a window frame and a door frame. FIG. 6 is a view illustrating geometric types formed by feature lines and straight lines according to preferred embodiments of the present invention, and the features lines of FIG. 6 are illustrated on an image of FIG. 7. Referring to FIG. 7, type 1 is implemented at a corner of an extraneous (sticked) matter such as a mirror, type 2 is implemented at a corner of a room, and type 3 is implemented at an overlapped part between door frames or window frames. The types are implemented by intersecting feature lines and other straight lines with each other, and intersection points are implemented as the feature points. Here, the feature lines indicate vertical lines toward the center of a camera view along an extraneous (sticked) matter on a wall, such as a door, a window and a mirror.

Some of the feature points are positioned on the feature line. That is, intersection points between the feature lines and the straight lines correspond to the feature points (S230). The mobile robot calculates a similarity between the feature points, and recognizes a position of the mobile robot based on feature points having a largest similarity. The mobile robot matches feature points with each other by using information on the feature points extracted from a plurality of detected images (S400). The mobile robot recognizes its position based on a result of the feature point matching (S500). Alternatively, the mobile robot matches feature points with each other by using pre-stored image information, i.e., information on feature lines, feature points and images (S400), and recognizes its position (S500).

The method for controlling a mobile robot according to one embodiment of the present invention further comprises a moving distance measuring step (not shown) of measuring a moving distance of the mobile robot. The mobile robot may more precisely recognize its position with using a recognized position based on the result of the feature point matching, and a recognized position based on the moving distance.

Figure 9:
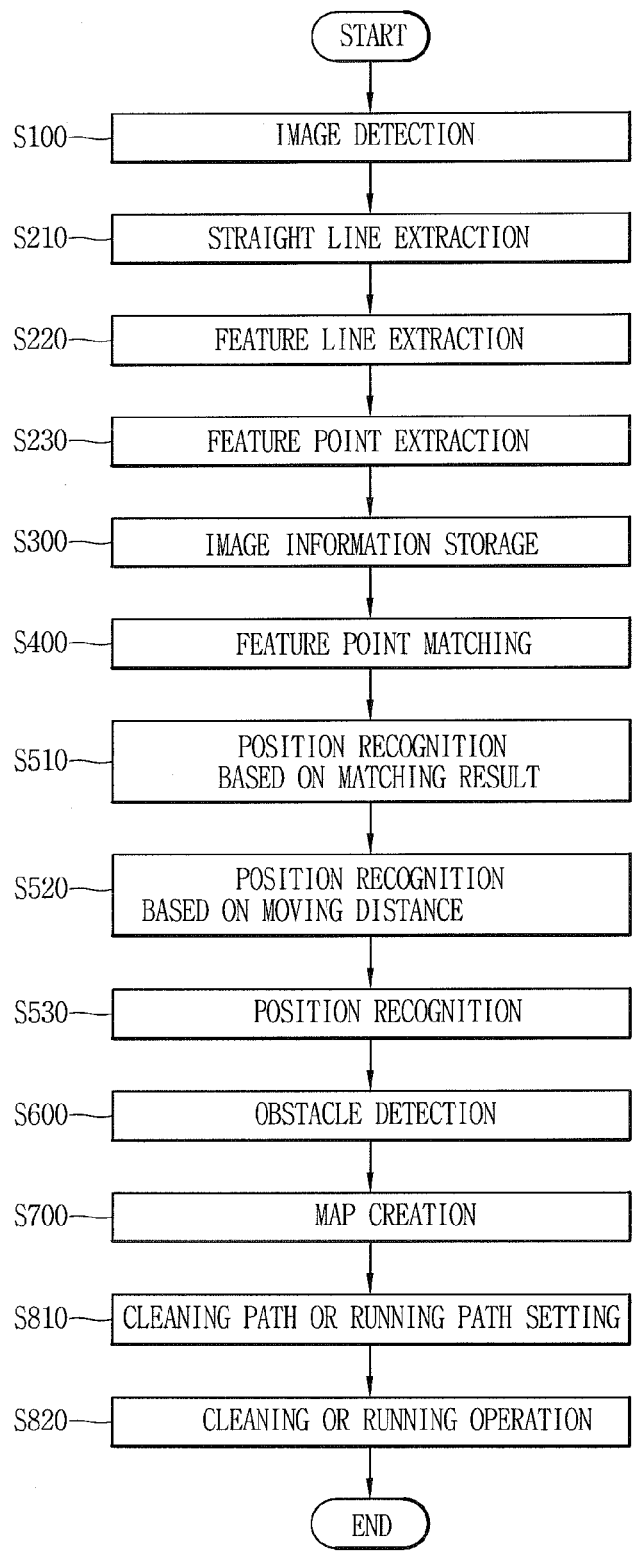
FIG. 9 is a flowchart schematically illustrating a method for controlling a robot cleaner according to another embodiment of the present invention.

FIG. 9 is a flowchart schematically illustrating a method for controlling a robot cleaner according to one embodiment of the present invention. Referring to FIG. 9, a method for controlling a mobile robot according to one embodiment of the present invention comprises an image detection step (S100) of detecting one or more images by capturing the periphery, a straight line extraction step (S210) of extracting one or more straight lines from the image, a feature line extraction step (S220) of extracting, from the straight lines, one or more feature lines toward the center of the image, a feature point extraction step (S230) of extracting one or more feature points from the image, a feature point matching step (S400) of matching the feature points with each other, a position recognition step (S500) of recognizing a position of the mobile robot based on a result of the feature point matching, and a position recognition step (S520) of recognizing a position of the mobile robot based on a moving distance of the mobile robot. Device configurations will be explained with reference to FIGS. 3 to 5.

Firstly, the mobile robot detects a plurality of images through the image detection unit (S100). Here, the image detection unit may be implemented as an upper camera for detecting an upper image by capturing an upper side, or a front camera for detecting a front image by capturing a front side. Then, the mobile robot extracts one or more straight lines from the images (S210). The straight line is extracted from a plurality of images such as an upper region including a ceiling, a fluorescent lamp disposed at a front side and an interior structure. The mobile robot extracts, from the straight lines, a straight line emitted from the center of a camera view, i.e., a feature line (S220). The mobile robot extracts feature points from a plurality of images such as an upper region including a ceiling, a fluorescent lamp disposed at a front side, and an interior structure (S230). Then, the mobile robot calculates a distance between feature points to calculate a similarity, and matches the feature points with each other based on the similarity (S400). Some of the feature points are positioned on the feature line. That is, intersection points between the feature lines and the straight lines correspond to the feature points. The mobile robot calculates a similarity between the feature points by using feature point information, and recognizes its position based on feature points having a largest similarity. The mobile robot matches feature points with each other by using information on the feature points extracted from a plurality of images captured with a predetermined period, and recognizes its position based on a result of the feature point matching. Alternatively, the mobile robot matches feature points with each other by using pre stored image information (i.e., information on feature lines, feature points and images) and information on currently-detected images, and recognizes its position (S510). And, the method for controlling a mobile robot according to one embodiment of the present invention further comprises a moving distance measuring step (not shown) of measuring a moving distance of the mobile robot. The mobile robot may more precisely recognize its position with using a recognized position based on the result of the feature point matching, and a recognized position based on the moving distance (S520 and S530).

Referring to FIG. 9, a method for controlling a robot cleaner according to one embodiment of the present invention comprises an obstacle detecting step (S600) of detecting a peripheral obstacle, a map creating step (S700) of creating a map based on the obstacle, a path establishing step (S810) of establishing a cleaning path or a running path based on the map, and a cleaning or running executing step (S820) of executing a cleaning operation or a running operation based on the established cleaning path or running path.

The mobile robot is configured to detect a peripheral obstacle by an obstacle detection unit while being moved or performing a cleaning operation (S600), and is configured to create a map based on the obstacle (S700). Then, the mobile robot is configured to establish a cleaning path or a running path based on the map (S810). Then, the mobile robot is configured to correct the cleaning path or the running path based on a position recognized through a matching result between feature points, and based on a position verified with using a moving distance (not shown). Then, the mobile robot is configured to perform a cleaning operation based on the corrected cleaning path or to run based on the corrected running path (S820).

The mobile robot according to one embodiment of the present invention extracts a plurality of feature points from images, and recognizes its position by matching the feature points with each other. Here, the mobile robot may reduce the amount of calculations and may match feature points with each other more precisely, by extracting a plurality of feature lines from images, and by matching the feature points formed by the feature lines and straight lines with each other. Part of the feature points may disappear or may be newly extracted according to changes of illumination. When illumination is drastically changed, e.g., when illumination is turned on/off, part of the feature points may be generated or may disappear. However, in the mobile robot according to the present invention, feature points robust against an illumination change are extracted through geometric constraints, and the feature points are matched with each other. This may allow a position of the mobile robot to be more precisely recognized without environmental constraints.

As aforementioned, in the mobile robot (including a robot cleaner) and the controlling method of the same according to the present invention, a position recognition error may be reduced and a position recognition of the mobile robot may be precisely performed through geometric constraints, even in the occurrence of a change of external illumination when recognizing its position with using a low quality camera. Furthermore, feature points may be extracted from images detected with using a low quality camera, and the feature points may be robustly matched with each other even in the occurrence of a change of external illumination, through geometric constraints due to the feature lines. This may enhance the performance of the conventional method for recognizing a position based on a camera susceptible to a illumination change, and improve the efficiency of a system.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile robot, comprising:
    an image detection unit configured to detect one or more images in a vicinity of the mobile robot;
    a straight line extraction unit configured to extract one or more straight lines from at least one of the one or more images;
    a feature line extraction unit configured to extract, from the one or more straight lines, one or more feature lines toward a center of the at least one of the one or more images;
    a feature point extraction unit configured to extract one or more feature points from the at least one of the one or more images and to determine whether the extracted one or more feature points are one or more intersection points between one of the one or more feature lines and one of the one or more straight lines as one or more feature points; and
    a control unit configured to match the one or more feature points determined as the one or more intersection points with feature points of the at least one of the one or more images, and to recognize a position of the mobile robot based on a result of the feature point matching.

2. The mobile robot of claim 1, further comprising a storage unit configured to store therein image information including image information of the one or more images detected by the image detection unit, the one or more feature lines extracted by the feature line extraction unit, and the one or more feature points extracted by the feature point extraction unit.

3. The mobile robot of claim 2, wherein the control unit is configured to match a feature point stored in the storage unit with a feature point of an image detected by the image detection unit, and to recognize a position of the mobile robot based on a result of the feature point matching.

4. The mobile robot of claim 1, wherein the determined feature point includes feature point information comprising a position, an orientation and a descriptor of the identified feature point on the image.

5. The mobile robot of claim 4, wherein the control unit calculates a similarity between the determined one or more feature points with feature points of the at least one of the one or more images, and recognizes a position of the mobile robot based on feature points having a largest similarity.

6. The mobile robot of claim 1, further comprising:
    a driving unit configured to move the mobile robot by driving wheels provided on the robot; and
    a moving distance measuring unit connected to the wheels, and configured to measure a moving distance of the mobile robot.

7. The mobile robot of claim 1, wherein the image detection unit is implemented as an upper camera installed above the mobile robot, and configured to detect an upper image captured by the upper camera.

8. The mobile robot of claim 1, further comprising an obstacle detection unit configured to detect a peripheral obstacle, and to output obstacle information,
    wherein the control unit is configured to create a map by using the obstacle information, or by using the obstacle information and the position of the mobile robot.

9. A method for controlling a mobile robot, the method comprising:
    an image detection step of detecting, by an image detecting unit of the mobile robot, one or more images in a vicinity of the mobile robot;
    a straight line extraction step of extracting one or more straight lines from at least one of the one or more images;
    a feature line extraction step of extracting, from the one or more straight lines, one or more feature lines toward a center of the at least one of the one or more images;
    a feature point extraction step of extracting one or more feature points from the at least one of the one or more images and determining whether the extracted one or more feature points are one or more intersection points between one of the one or more feature lines and one of the one or more straight lines;
    a feature point matching step of matching the one or more feature points determined as the one or more intersection points with feature points of the at least one of the one or more images; and
    a position recognition step of recognizing a position of the mobile robot based on a result of the feature point matching.

10. The method of claim 9, further comprising an image information storage step of storing therein image information including image information of the one or more images, the one or more feature lines, and the one or more feature points.

11. The method of claim 10, wherein in the position recognition step, a stored feature point is matched with a feature point of the at least one of the one or more images, and a position of the mobile robot is recognized based on a result of the feature point matching.

12. The method of claim 9, wherein the determined feature point includes feature point information comprising a position, an orientation and a descriptor of the feature point on the image.

13. The method of claim 12, wherein the position recognition step includes:
    calculating each similarity between the determined one or more feature points with feature points of the at least one of the one or more images; and
    recognizing a position of the mobile robot based on feature points having a largest similarity.

14. The method of claim 9, further comprising a moving distance measuring step of measuring a moving distance of the mobile robot.

15. The method of claim 9, further comprising:
    an obstacle detecting step of detecting an obstacle in the vicinity of the mobile robot, and outputting obstacle information; and
    a map creating step of creating a map based on the obstacle information.

16. The method of claim 15, further comprising correcting the map based on the position of the mobile robot.

17. A non-transient computer readable storage medium having an algorithm stored therein, the algorithm configured to cause a processor of a mobile robot to perform:
    an image detection step of detecting one or more images in a vicinity of the mobile robot;
    a straight line extraction step of extracting one or more straight lines from at least one of the one or more images;
    a feature line extraction step of extracting, from the straight lines, one or more feature lines toward a center of the image;
    a feature point extraction step of extracting one or more feature points from the image and determining whether the extracted one or more feature points are one or more intersection points between one of the one or more feature lines and one of the one or more straight lines as one or more feature points;
    a feature point matching step of matching the one or more feature points determined as the one or more intersection points with feature points of the at least one of the one or more images; and
    a position recognition step of recognizing a position of the mobile robot based on a result of the feature point matching.

18. The non-transient computer readable storage medium of claim 17, wherein the algorithm is further configured to cause the processor of the mobile robot to perform:
    an obstacle detecting step of detecting a peripheral obstacle, and outputting obstacle information; and
    a map creating step of creating a map based on the obstacle information.

* * * * *